United States Patent
Bennett et al.

(10) Patent No.: US 6,429,939 B1
(45) Date of Patent: Aug. 6, 2002

(54) DSP SIGNAL PROCESSING FOR OPEN LOOP FIBER OPTIC SENSORS

(75) Inventors: Sidney M. Bennett, Chicago; Richard B. Dyott, Oak Lawn, both of IL (US)

(73) Assignee: KVH Industries, Inc., Tinley Park, IL (US)

( * ) Notice: Subject to any disclaimer, the term of this patent is extended or adjusted under 35 U.S.C. 154(b) by 91 days.

(21) Appl. No.: 09/615,181

(22) Filed: Jul. 13, 2000

(51) Int. Cl.[7] ............................................. G01C 19/72
(52) U.S. Cl. ...................................... 356/463; 356/483
(58) Field of Search .............................. 356/460, 463, 356/464, 483; 250/227.19, 227.27; 385/12

(56) References Cited

U.S. PATENT DOCUMENTS

| | | | |
|---|---|---|---|
| 4,630,229 A | 12/1986 | D'Hondt | 364/726 |
| 4,765,739 A | 8/1988 | Koizumi et al. | |
| 4,796,993 A * | 1/1989 | Sonobe et al. | 356/463 |
| 4,848,910 A | 7/1989 | Dupraz | 356/350 |
| 4,883,358 A * | 11/1989 | Okada | 356/463 |
| 5,033,854 A | 7/1991 | Matthew et al. | |
| 5,048,962 A | 9/1991 | Kurokawa et al. | |
| 5,080,489 A | 1/1992 | Nishikawa et al. | |
| 5,133,600 A | 7/1992 | Schröder | |
| 5,289,257 A | 2/1994 | Kurokawa et al. | |
| 5,359,413 A | 10/1994 | Chang et al. | |
| 5,412,471 A | 5/1995 | Tada et al. | |
| 5,459,575 A * | 10/1995 | Malvern | 356/463 |
| 5,493,396 A | 2/1996 | Sewell | |
| 5,504,684 A | 4/1996 | Lau et al. | |
| 5,654,906 A | 8/1997 | Youngquist | |
| 5,682,241 A | 10/1997 | Mark et al. | |
| 5,701,177 A | 12/1997 | Kumagai et al. | |

OTHER PUBLICATIONS

Gronau Yuval et al.; "Digital Signal Processing For An Open–Loop Fiber–Optic Gyroscope", Applied Optics, Optical Society of America, Washington, U.S., vol. 34, No. 25, Sep. 1, 1995, pp. 5849–5853.

\* cited by examiner

*Primary Examiner*—Samuel A. Turner
(74) *Attorney, Agent, or Firm*—Foley Hoag & Eliot, LLP

(57) ABSTRACT

A fiber optic sensor with a digital signal processing system and a method of using a digital signal processing system with a fiber optic sensor is disclosed. The system digitally samples the output signal of the fiber optic sensor at a frequency which is an integer multiple of the modulator drive frequency and multiplies the sampled output signal with predetermined sine and cosine coefficients corresponding to the (fundamental) modulator drive frequency and at most the second, third and fourth harmonic thereof. This simple system can maintain a constant modulation depth and modulator phase shift and provide sensor output data over a wide operating range of the fiber optic sensor. The fiber optic sensor can be employed, for example, for rotation rate and magnetic field measurements.

19 Claims, 5 Drawing Sheets

US 6,429,939 B1

DSP SIGNAL PROCESSING FOR OPEN LOOP FIBER OPTIC SENSORS

FIELD OF THE INVENTION

The invention is directed to fiber optic sensors, and more particularly to digitally processing signals derived from fiber optic sensors.

BACKGROUND OF THE INVENTION

An open loop fiber optic sensor, such as an open loop fiber optic gyro (FOG), has the advantage of simplicity and low cost compared to a closed loop configuration. On the other hand, closed loop FOGs have the advantage of excellent bias stability, linearity and scale factor stability, although some of these characteristics require thermal modeling on an individual unit basis. The open loop gyroscope has a first order sinusoidal response to rotation, and the scale factor is dependent on both the optical intensity at the detector and the modulation depth. These considerations have limited the performance of most open loop gyroscopes.

The theory of open loop gyroscopes is known in the art. The direction of rotation can be determined and the sensitivity optimized by applying a phase modulation at a frequency $f_1$ to the light propagating in the fiber optic sensing coil, for example, through a piezoelectric element. Alternatively, with some sensor configurations, such as a reflective current sensor, a birefringent modulator could be employed. The Sagnac interferometer converts this modulation into a detected output signal represented by a series of Bessel functions. The amplitudes of the odd harmonics at the modulation frequency and its harmonics are proportional to the sine of the rotation rate, while the amplitudes of the even harmonics are proportional to the cosine of the rotation rate. All of the information required to determine the rotation rate and to linearize and stabilize the scale factor can be extracted from the fundamental signal and the second and fourth harmonics.

Conventional open-loop FOG systems process the signal in analog form, which represents an approximation of an analytic approach. A FOG can be operated with a low Sagnac scale factor by using a short length coil and restricting the maximum input rate. The operating regime is thus selected to be near the zero of the sine function at the fundamental frequency. For a small modulation depth, the sine function can be approximated by a linear function. The amplitude of the second harmonic is then at the peak of a cosine function and consequently varies very little with the rate. The peak value of the second harmonic can be used as a measure of the detected signal intensity to control and maintain the light source power over time and operating temperature. The self-oscillating PZT can be operated at approximately the same modulation depth over temperature. With these design criteria, analog signal processing can provide a rate gyro with acceptable rate gyro performance. However, further improvements of the analog processing are likely to be more complex, will require additional alignment steps during manufacture, and reduce the reliability. Even at present, the large number of discrete components makes FOGs with analog signal processing marginal in high reliability applications. In addition, the design constraints imposed by the required linearity and sensitivity are often difficult to attain jointly.

Some of the problems described above have been addressed in the prior art by employing digital signal processing (DSP) concepts in at least a part of the electronic circuitry. For example, individual synchronous detectors were driven with the fundamental or a desired harmonic, followed by A/D conversion. This approach requires the generation of the fundamental by dividing a clock frequency such that all of the required harmonics are generated individually. In another approach, the photo detector signal was converted from analog to digital (A/D), wherein the A/D sample rate does not have an integral relationship with the modulation frequency, so that the signal processing approach relies on a FFT technique to isolate the required frequencies. Further, since the signal may not be centered in each frequency bin, the amplitude of the Fourier transform may be affected and/or distorted by the particular windowing function used. According to yet another prior art approach, a downsampling technique was used, wherein the A/D sample rate clock is derived from the same oscillator as the PZT modulation frequency, but with a different divide ratio. While this substantially reduces the throughput demands on the A/D converter and the signal processing electronics, undersampling folds the gyro broadband noise into the processing bandwidth and increases the angle random walk (ARW).

It would therefore be desirable to provide a digital signal processing system and method for a fiber optic sensor that simplifies the circuitry, improves the linearity, the scale factor and the bias stability, and provides more flexible design rules, without introducing artifacts from the digital sampling process.

SUMMARY OF THE INVENTION

The invention is directed to a system and method for digitally processing the fiber optic sensor output signal using a limited number of frequencies where the frequency used to drive the birefringent modulator or phase modulator is an integer multiple of the A/D sampling frequency.

According to one aspect of the invention, a digital signal processing system for a fiber optic sensor used to measure a physical quantity, such as a rotation rate or a magnetic field, includes a digital signal processor (DSP); an oscillator or frequency syntheziser which may be controlled by the DSP or other means known in the art, producing a sample rate clock frequency which is an integer multiple of a modulator drive frequency of the fiber optic sensor; and a memory in communication with the DSP and storing frequency coefficients which are precomputed at the modulator drive frequency and at the second and fourth harmonic of the modulator drive frequency. The system further includes a signal converter for sampling at the clock frequency an output signal produced by the fiber optic sensor. The DSP multiplies the sampled output signal with respective ones of the frequency coefficients and forms in-phase and, if necessary, also quadrature components at the respective frequencies to compute the physical quantity. Alternatively, the phase of the frequency coefficients can be adjusted so that the reference signal is in phase with the gyro signal. This arrangement has the advantage of obviating the need for detecting the quadrature components, thereby eliminating the noise contribution from the quadrature components and improving the overall sensitivity.

The fiber optic sensor includes a fiber sensing coil; a light source supplying optical radiation to the fiber sensing coil; a modulator disposed between the fiber sensing coil and the light source, wherein the modulator is driven at a modulator frequency and modulates the optical radiation supplied to the sensing coil. A light detector detects return optical radiation returned from the fiber sensing coil and provides an output signal corresponding to a physical quantity detected by the fiber sensing coil. A light source driver controlled by the DSP supplies a current to the light source so as to maintain at least one of a constant intensity of the optical radiation produced by the light source and an optical power of the return optical radiation detected by the light detector.

According to another aspect of the invention, in a method of digitally processing a signal of a fiber optic sensor, a clock frequency is produced which is an integer multiple of a modulator drive frequency. Sine and cosine coefficients are computed at the modulator drive frequency and at a plurality of integer multiples of the modulator drive frequency for a plurality of discrete signal sampling times. The signal of the fiber optic sensor is acquired at the discrete signal sampling times over an integration period and the acquired signal at the discrete signal sampling times are multiplied with the corresponding sine and cosine coefficients obtained at the same discrete signal sampling times to define a sensor state vector. Characteristic operating parameters of the fiber optic sensor, such as a modulation depth and a phase shift, and a fiber optic sensor output signal representing, for example, a rotation rate and/or a magnetic field, are determined from the sensor state vector.

Embodiments of the invention may include one or more of the following features. The digital signal processing system may include adjusting means for adjusting a modulation depth at the modulator drive frequency based on the in-phase and quadrature components. The modulation depth may be adjusted by adjusting a modulator drive voltage and/or a modulator drive frequency. Acquiring the signal of the fiber optic sensor may include acquiring the signal during a time period corresponding to the fundamental frequency and repeatedly adding the signal acquired during the time period to a buffer memory until the integration period is exhausted. An initial phase shift may be determined during the setup of the fiber optic sensor and the second phase shift is matched to the initial phase shift by adjusting the modulator drive frequency.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to a digital signal processing system for fiber optic sensors. In particular, the digital signal processing system described herein can be used to compute an output signal corresponding to a physical quantity measured by the fiber optic sensor coil, such as a rotation rate or a magnetic field.

Figure 1:
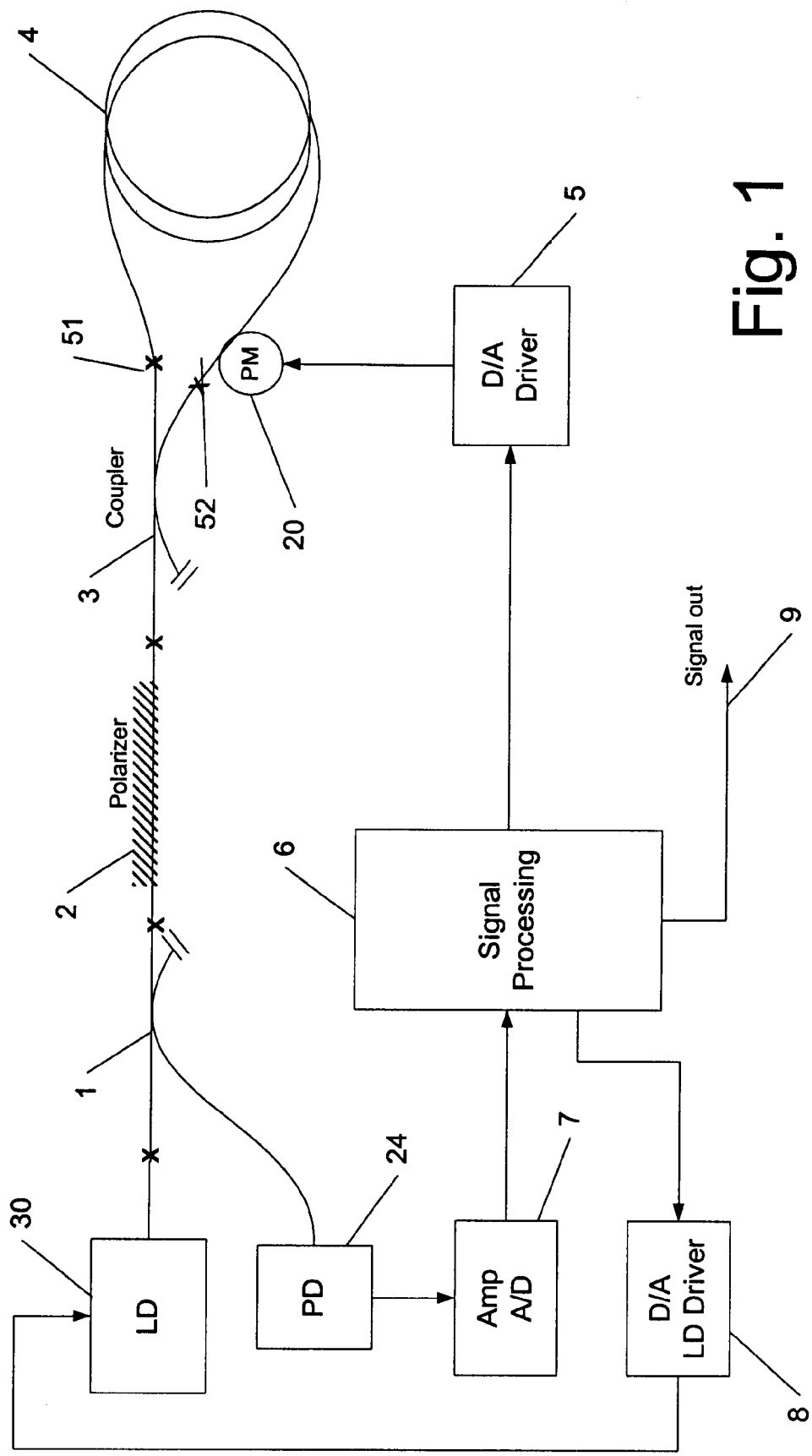
FIG. 1 is a schematic diagram of a fiber optic gyroscope.

FIG. 1 illustrates an exemplary embodiment of a conventional interferometric fiber optic gyroscope (FOG). Light emitted from a suitable light source 30 passes through a first 3 dB coupler 1 where half of the light is dissipated, and half is sent into the interferometer through the polarizer 2. A second 3 dB coupler 3 splits the light into two approximately equal intensity, counter-propagating beams which traverse the coil. The two light beams exiting the coil then recombine at the second coupler 3 where they interfere. This combined light beam then passes through the polarizer 2 a second time in the opposite direction, and half of the light is directed to the photodetector 24 by the first coupler 1. An optical splitting ratio of 3 dB is typically selected for the couplers to maximize the optical power incident on the detector. A magnetic field sensor, which can be used to sense an electric current, operates according to the same principle with the addition of two $\lambda/4$ waveplates 51, 52 placed near the sensor coil ends. Those skilled in the art will understand that the $\lambda/4$ waveplates are located at the end of polarization-maintaining fiber leads which can have a considerable length. The $\lambda/4$ waveplate 52 can also be located on the other side of the PZT modulator, i.e., on the far end of the PZT modulator.

A piezo-electric transducer (PZT) 20 can be used to modulate the phase difference between the two counter-propagating light beams. Other methods of modulating the phase difference, for example, using an electro-optic material such as lithium niobate and/or non-linear polymers, can also be employed. This phase modulation serves two purposes. One is to dynamically bias the interferometer to a more sensitive operating point and also allow the determination of rotation sense. The other is to move the detected signal from direct current (DC) to alternating current (AC) in order to improve the accuracy of the electrical signal processing. With sinusoidal phase modulation, the interferometer output signal is an infinite series of sine and cosine waveforms whose maximum amplitudes are Bessel functions related to the phase modulation amplitude. As will be discussed in greater detail below, the ratio of the fundamental and the three next lowest order harmonic signals amplitudes can be used to detect rotation rate and/or magnetic field, while at the same time maintaining a stable, linear output scale factor. The light source intensity and modulator amplitude can be controlled via drivers 5, 8 by analog and/or digital electronic hardware 6 which receives input signals from detector 24 via amplifier 7.

Alternatively, the fiber optic sensor can also have a reduced minimum configuration (RMC) as disclosed, for example, in the pending U.S. patent application Ser. No. 09/459,438 and the concurrently filed U.S. application entitled "Reduced minimum configuration fiber optic current sensor" to Sidney Bennett Ser. No. 09/615,166 both of which are commonly assigned to the assignee of the present application and are incorporated herein by reference.

Figure 5:
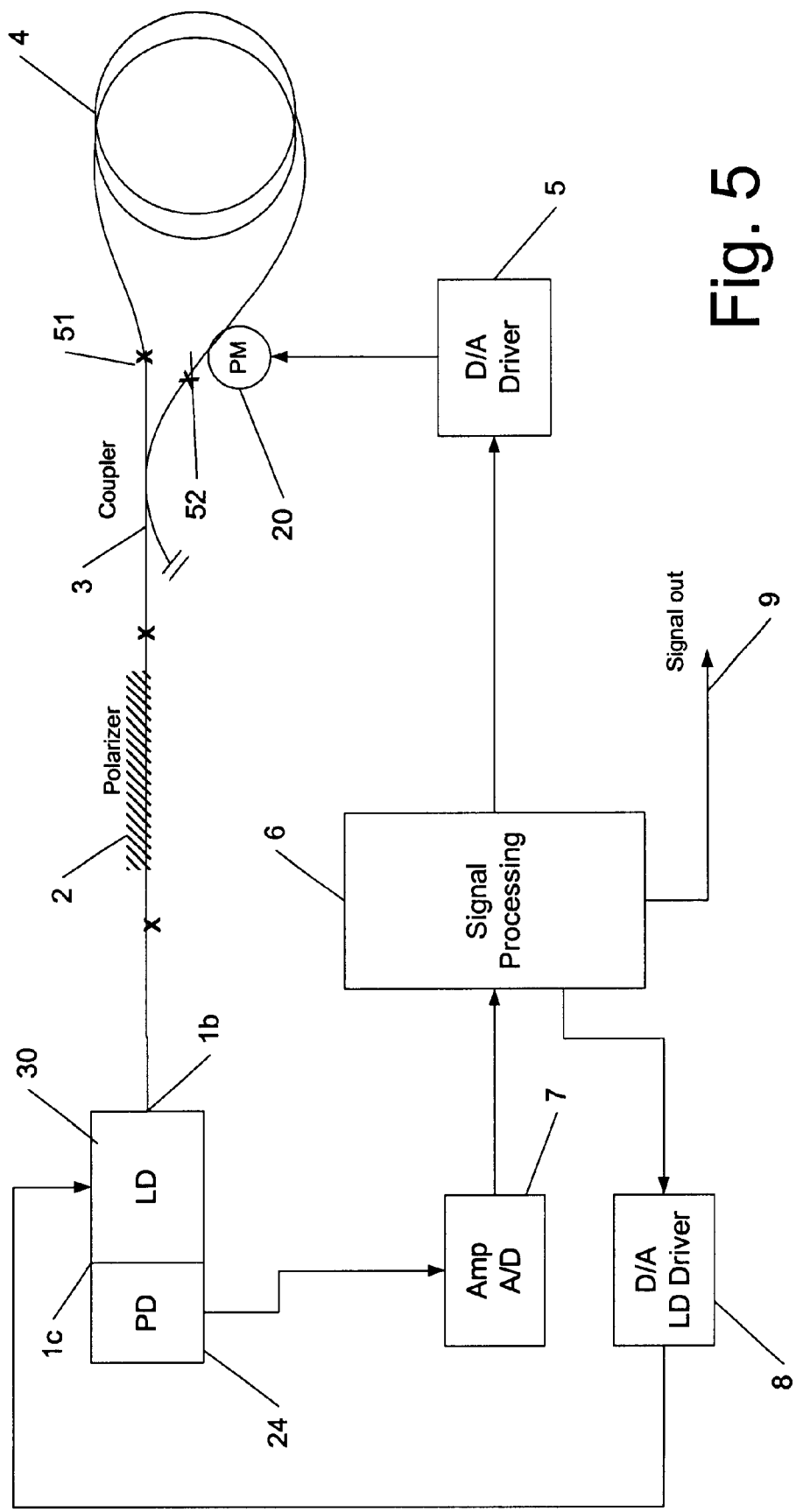
FIG. 5 is a schematic diagram of a reduced minimum configuration fiber optic sensor.

In a RMC fiber optic current sensor (FOCS) illustrated in FIG. 5, the first coupler 1 is omitted and the interferometer/polarimeter output is read out by a detector 24' positioned at a back facet output of the light source 30. The light source 30 emits light from a front output facet 30b which is polarized by polarizer 2. Several types of light sources can be used, including a laser diode (LD), a superluminescent diode (SLD), and light emitting diode (LED), or a superradiant fiber amplifier. The polarizer 2 can be, for example, a fiber polarizer, a lithium niobate polarizer or a polymer waveguide polarizer. Coupler 3 splits the light into two counter-propagating beams of an approximately equal intensity. Quarter wave plates 51, 52 are inserted in the optical path at both ends of the sensing coil. The quarter wave plates 51, 52 convert the linearly polarized light produced by polarizer 2 into circularly polarized light which counter-propagates in the sensing coil 4. A magnetic field introduces a phase shift (Faraday rotation) of the counter-propagating circularly polarized light beams, wherein the direction of the phase shift depends on the propagation direction of the circularly polarized light beams with respect to the direction of the magnetic field. The quarter wave plates 51, 52 convert the respective returned circularly polarized light beams, which have passed through the sensing coil, back into linearly polarized light beams which are then recombined in the coupler 3. The coupler 3 can be a directional coupler formed from optical fiber or integrated optics components.

The recombined light beam then passes through the source 30 and is received at a back facet output 30c of the light source 30 by a detector 24'. The detector 24' can be a photodetector coupled to an amplifier 7, similar to the embodiment of FIG. 1.

Figure 2:
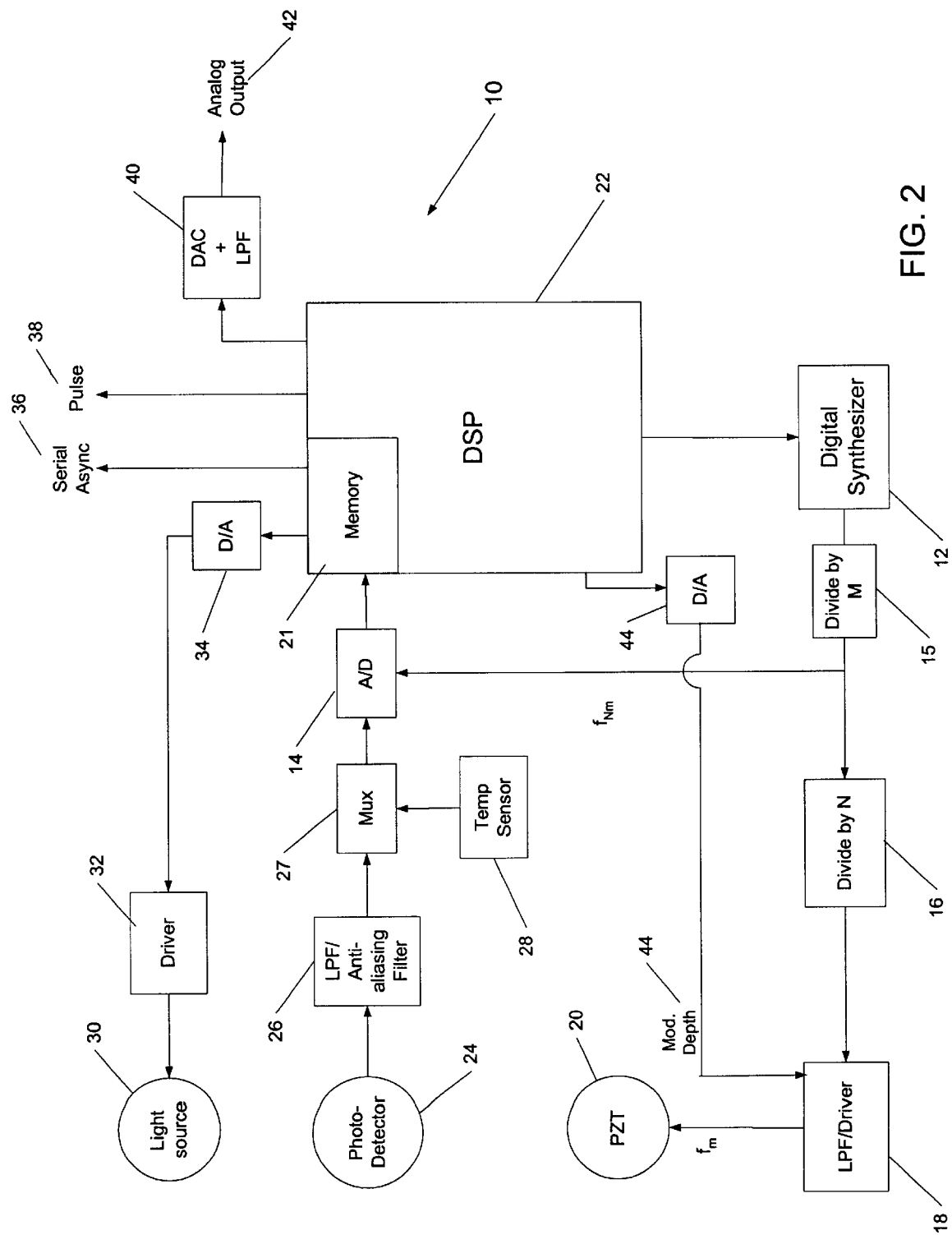
FIG. 2 is a block diagram of DSP sensor electronics according to the invention.

Referring now to FIG. 2, an electronic control system 10 for a fiber optic gyro (not shown) includes a digital signal processor (DSP) 22 and an oscillator, such as a digital synthesizer 12 which may be controlled by the DSP 22, providing a clock frequency $f_c$. The clock frequency may optionally be stepped down by a divider 15, for example, by division by an integer M in divider 15, to yield a frequency $f_{Nm} = N \times f_m$, wherein $f_m$ is the intended drive frequency of a PZT phase modulator 20. The synthesizer 12 may be, for example, the Model AD9850 programmable frequency synthesizer from Analog Devices, Norwood, Mass. The AD9850 generates a spectrally pure, frequency/ phase programmable, analog output sine wave; the device also provides five bits of digitally controlled phase modulation, which enables phase shifting of its output. The frequency $f_m$ can be generated from the synthesizer frequency $f_{Nm}$ by dividing the frequency $f_{Nm}$ by N in divider circuit 16. The synthesizer frequency $f_{Nm}$ is also used to clock an A/D converter 14 at the rate N times higher than the PZT modulation frequency $f_m$, so that an integral number of samples of the fundamental mode and the first 3 higher harmonics of the modulation frequency can be obtained with N successive A/D conversions. The photo detector 24 detects the fiber gyro output light. The output of photo detector 24 passes through a low pass filter 26 to eliminate noise fold-over and aliasing, although aliasing of the higher Bessel harmonics is not a significant problem as the amplitude of the harmonics higher than the 4th harmonic is significantly lower than the amplitude of the lower harmonics. A temperature sensor 28 may be required to monitor the gyro temperature characteristics, although the temperature may be sampled at a lower rate than the gyro signal. As seen in FIG. 2, the signal from the temperature sensor 28 may be multiplexed with the signal received from the photo detector 24 in multiplexer 27, with the mixed signal supplied to an input of DSP 22. However, a separate A/D converter (not shown) may be used for the temperature sensor 28 due to the lower sampling rate.

The relationship of the PZT modulation frequency to the resonant frequency of the PZT is maintained by measuring the phase of the second harmonic signal and adjusting the frequency such that the phase is maintained at a constant value. Due to the change in mechanical Q with temperature, it may be desirable to be able to adjust the PZT drive amplitude to maintain the modulation depth. Alternatively, the change in modulation depth can be determined and used to correct the scale factor analytically. In an alternative embodiment, the PZT modulation frequency can be kept constant and the resulting change in the phase shift between the modulation frequency and the gyro output compensated by adjusting the phase $\Theta_r$ of the coefficients at the fundamental frequency and the higher harmonic frequencies, as discussed below.

Current driver 32 supplies a current to light source 30 which forms the light source of the gyro. The light source drive current required to maintain the same detected power is a function of temperature. This is primarily due to the change in the efficiency of the light source 30 with temperature, but also to small changes in the optical losses in the gyro. The light source drive current is controlled by the DSP 22, with the digital control signal from the DSP 22 converted into an analog control signal by D/A converter 34. The light source modulation depth 44 can be derived at the output of D/A converter 46 and supplied to driver 18 to adjust the modulation depth of the PZT modulator 20.

Output signals representing the gyro rate can be supplied by the DSP 22 in various forms, for example, as a serial asynchronous output signal 36 and/or as a pulsed output 38 in the form of pulse trains representing, for example, incremental changes in angle (e.g., arc seconds per pulse) which is typically employed with higher performance gyro systems. An analog output 42 could be useful to interface to control systems and for retrofit applications.

Figure 3:
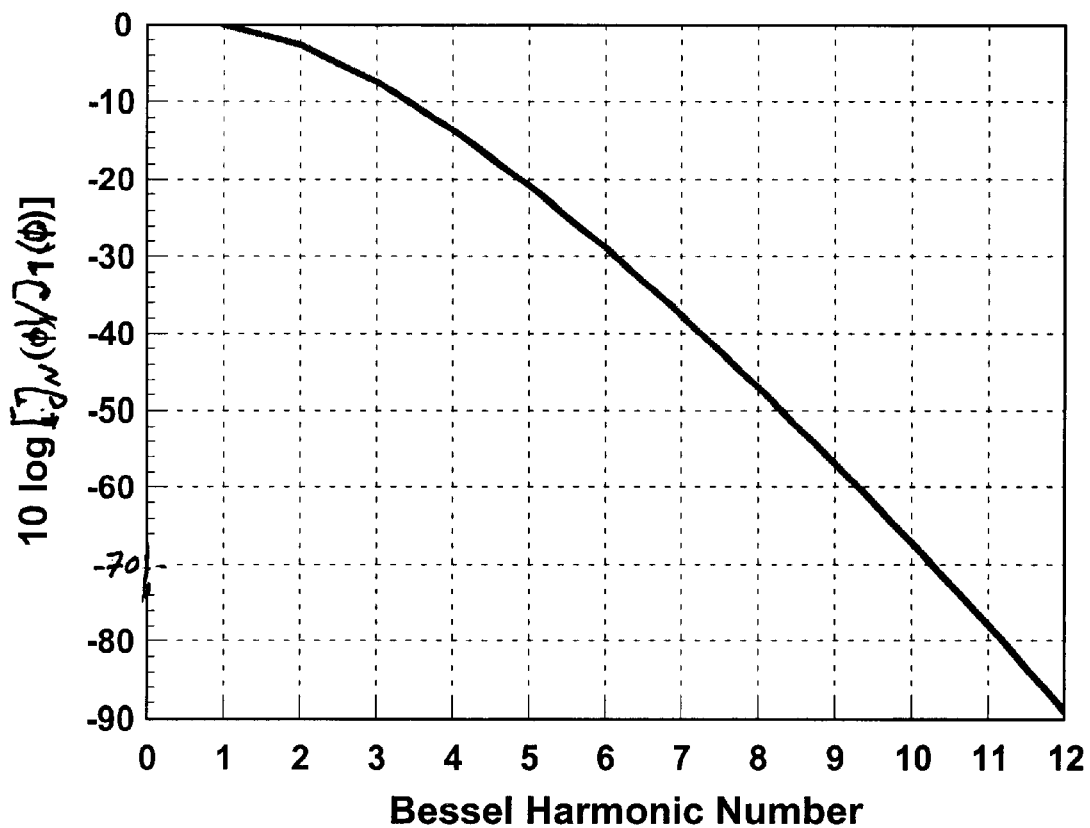
FIG. 3 shows the amplitude ratio of the $n^{th}$-order Bessel function $J_n(x)/J_1(x)$ for x=1.84.

FIG. 3 shows the ratio of Bessel harmonics $J_n(x)J_1(x)$ for $x=1.84$ which represents the x-value at which $J_1(x)$ has a maximum. The ordinate is plotted in a logarithmic scale. As can be seen in FIG. 3, the amplitude of the Bessel harmonics at $x=1.84$ falls off quickly above the 4th order, suggesting that the anti aliasing filter 26 need not have a low corner frequency or significant roll off. However, an anti-aliasing filter is required in order to eliminate the broadband Angle-Random-Walk (ARW) that would fold down into the processing band. The filter need not be very sharp, and a rejection of 10–15 dB at the $15^{th}$ harmonic will be adequate. The sample rate clock should be at least 8 times the fundamental frequency to avoid aliasing. A factor of 16 or more may be desirable to avoid temperature effects and phase shifts in the anti-aliasing filter 26.

Moreover, with integral ratio (8, 16, etc.) between the sampling clock rate and the fundamental frequency, the aliased frequencies coincide with the corresponding lower harmonics and the fundamental. For a ratio of 16, the fold-over starts with the $9^{th}$ order Bessel function, which is an odd multiple and thus proportional to the sine of the rotation rate. The $15^{th}$ harmonic folds onto the fundamental, and it is over 120 dB down. The $14^{th}$ harmonic folds onto the $2^{nd}$ harmonic and is about 105 dB down.

In general, only three harmonics are required to fully characterize the gyro performance and thereby determine the rate. The reference waveforms for the three frequencies can be generated as part of the boot process or precomputed and stored in a non-volatile memory. For exemplary 24 sampling points across a specified sampling time period, the following coefficients can be computed for finding the amplitude and phase at the frequencies $f_i$:

At the fundamental frequency $f_1$ $$\sin((2\pi/24*n+\Theta_r))$$

$$\cos((2\pi/24*n+\Theta_r))$$

where n=0, . . . 23
At the second harmonic frequency $f_2$ $\sin((4\pi/24*n+\theta_r))$ $\cos((4\pi/24*n+\theta_r))$ where n=0, . . . 23

At the fourth harmonic frequency $f_4$ $\sin((8\pi/24*n+\theta_r))$ $\cos((8\pi/24*n+\theta_r))$ where n=0, . . . 23.

$\theta_r$ represents the phase difference between the voltage applied to the PZT and the optical modulation and is determined during initial calibration. Alternatively, the value $\theta_r$ can be periodically calibrated during a time when the modulation frequency is constant.

We assume that the sine and cosine values above are stored in RAM memory. For each digitally sampled data point, 8 values are computed, corresponding to $S_{1I}$, $S_{1Q}$, $S_{2I}$, $S_{2Q}$, $S_{4I}$, $S_{4Q}$.

$S_{1I}$ is the in-phase component of the fundamental modulation frequency $S_{1Q}$ is the quadrature component of the fundamental modulation frequency $S_{2I}$ is the in-phase component of the second harmonic of the modulation frequency $S_{2Q}$ quadrature component of the second harmonic of the modulation frequency $S_{4I}$ is the in-phase component of the fourth harmonic of the modulation frequency $S_{4Q}$ is the quadrature component of the fourth harmonic of the modulation frequency With an exemplary PZT frequency of 135 kHz, 24×135×$10^3$×8 multiplications and additions have to be performed per second, corresponding to a sampling frequency of 25.9 MHz. The various I and Q values are added and accumulated for a time t that is related to the approximate output bandwidth of the gyro, for example, 0.001 sec (1000 Hz). The I and Q values are added by taking sequential blocks of (in the present example) 24 A/D sample points n=0, . . . 23 and multiplying the sample points by the corresponding sine and cosine values stored in the reference waveform table. The resultant values are added to the corresponding registers for M blocks of data, wherein in the present example M=135 samples/millisecond, representing MN=3240 input data samples for N=24, corresponding to the frequencies of interest $f_1$, $f_2$, $f_4$.

Figure 4:
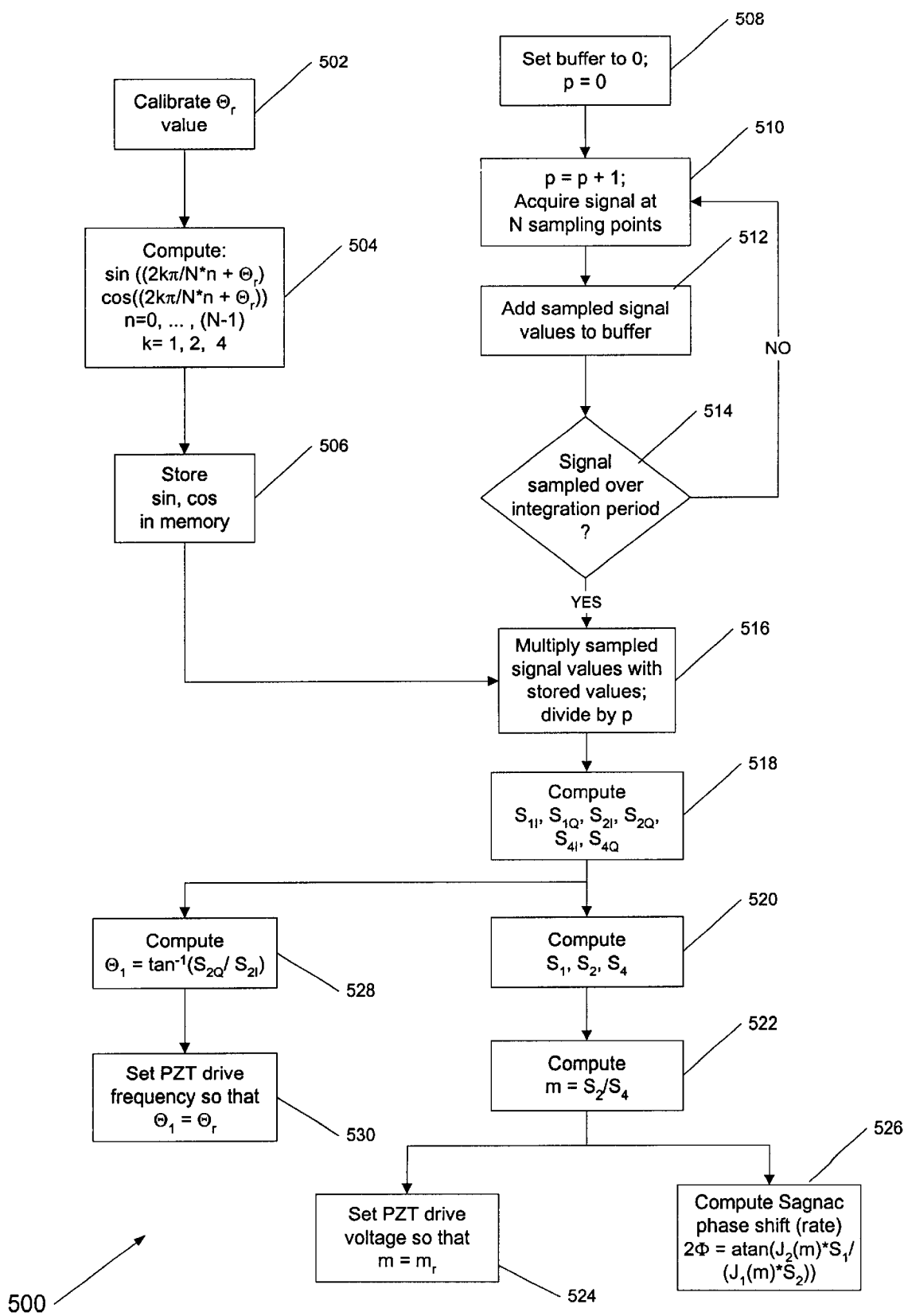
FIG. 4 is a flow chart of a process according to the invention for digitally processing a signal from a fiber optic sensor.

Since the operation of multiplying with the function values stored in memory and adding the sampled data points are commutative, it can be advantageous to first add the sampled data points over the sample time interval and then to multiply the aggregated data points with the function values. As shown in FIG. 4, the signal repeats itself every N samples, so that corresponding data samples spaced at every $24^{th}$ sample interval can be first added over an entire integration period of, for example, 0.01 sec and then multiplied by the function values stored in memory. This would significantly reduce the number of required multiplications from 25.9*$10^6$/second to 24×100×6=14.4*$10^3$/second, for the exemplary bandwidth of 100 Hz.

With the aforedescribed approach, consecutive integration periods are processed sequentially and independently. Although low-pass filtering can be applied, the output signal tends to be somewhat "jerky" when compared to analog processing. This effect can be reduced by processing the signal in overlapped time segments. Moreover, the resultant output is faster than the aliasing requirement and can be smoothed. A 50% overlap would result in a twofold increase of the minimum multiplication rate, while a 75% overlap increases the minimum multiplication rate by a factor of 4 to 57.6*$10^3$/second. Accordingly, the data blocks would be added four times during each of the previously used (longer) integration periods.

In the previously described examples, it has been assumed that the entire time block is uniformly weighted in the time domain, which is equivalent to a low pass filter with a sin(x)/x filter shape having a first side lobe at −13 dB. It may therefore be necessary to add a smaller number of points and weight each of these points by a weighting function which approximates over a shorter time interval. In this case, a resulting spectral linewidth of about 100 times the bandwidth of 100 Hz equal to 10 kHz can be expected. If both overlap processing and spectral weighting are implemented, the overall multiplication frequency would be approximately 5 MHz. While this frequency is much higher than the frequency of 14.4*$10^3$/second obtained by adding the individual sample data points before multiplication, it is still less than the frequency of 25.9*$10^6$/second (25.9 MHz) obtained if each point is processed individually.

As described above, the accumulated values $S_{1I}$, $S_{1Q}$, . . . $S_{4I}$, $S_{4Q}$ can be used to compute the various parameters characterizing the gyro performance. One objective is to maintain the modulation depth of the gyro, as the gyro output signal is proportional to the gyro rate only if the modulation depth remains constant. The modulation depth can be adjusted in two ways: (1) by controlling the PZT drive voltage to maintain the ratio m=$S_2/S_4$ equal to a nominal value $m_0$ determined at calibration, (2) by controlling the PZT drive frequency, or by a combination of these methods.

In the first case, the ratio m=$S_2/S_4$ is computed by computing $S_2=(S_{2I}^2+S_{2Q}^2)^{1/2}$ and $S_4=(S_{4I}^2+S_{4Q}^2)^{1/2}$. As mentioned above, the ratio of the magnitudes of the signals at $f_2$ and $f_4$ is a function only of the modulation depth and independent of rate and detected signal intensity. In fact, the signal ratio $S_2/S_4$ is inversely proportional to modulation depth (and is reasonably linear in the range 1.5 to 3 radians). By forming the ratio $S_2/S_4$, the modulation depth can be kept constant, even if both the resonance frequency and the Q of the PZT modulator change with temperature. Some of this control could be effected by changing the modulation frequency to keep the modulation frequency a fixed distance (in bandwidths) from the resonance frequency.

In the second case, the phase of the second harmonic signal is used to adjust the PZT drive frequency to maintain the room temperature phase. First, $\theta_1$=atan $(S_{2Q}/S_{2I})$ is computed. If the PZT frequency is correct, then $\theta_r$−0. $\theta_r$ is here the phase difference between the PZT modulation and the frequency reference and determined during initial calibration, as mentioned above. This error term is averaged and used to change the PZT drive frequency through the DDS (direct digital synthesizer) to maintain this phase difference at zero. If the phase of the PZT voltage as well as the phase offset in the reference signals are properly set, then $S_{1Q}$ and $S_{2Q}$ should be essentially zero.

The Sagnac phase shift is $$2\phi = \tan^{-1}\left(\frac{S_1 * J_2(m)}{S_2 * J_1(m)}\right)$$

where $J_1$ (m) and $J_2$ (m) are the Bessel harmonics at the associated modulation depth.

As can be seen from the above equations, $S_1$ and $S_2$ include both the I and Q components of the demodulated signal, so that the values of $S_1$ and $S_2$ are independent of any phase error. However, the phase of $S_1$ and $S_2$ may have to be determined to ascertain the sense of rotation. The insensitivity of the rate scale factor to minor phase errors when both the I and Q channels are used is advantageous for applications requiring a high scale factor accuracy.

A process 500 for computing the Sagnac phase shift is illustrated in FIG. 4. In a first step 502, the phase $\Theta_r$ shift inherent in the gyro system is calibrated and stored in a memory which can be part of the DSP 22. With the divider 12 selected to divide the frequency $f_{Nm}$ produced by the digital synthesizer 12 by N, the sine and cosine function coefficients are computed for the fundamental frequency and the second and fourth harmonic (k=1, 2, 4) at the N sampling points n=0, . . . , N−1, step 504. For example, for the above listed frequencies and N=24 equally spaced sampling points, a total of 96 coefficients are computed. The computed coefficients are stored in a memory, which may also be incorporated in the DSP 22, step 506. The gyro signal is transformed into the frequency domain at the fundamental frequency and the second and fourth harmonic frequencies by multiplying respective sampling points with the computed coefficients, as described below.

The actual measurements are performed by initially setting a buffer memory which may also reside in the DSP 22, as well as a counter p to zero, step 508. In step 510, the gyro signal is acquired at the N sampling points and the counter is incremented by one. The total of N sampled gyro signal values are then added to the buffer memory, step 512. The gyro signal is typically averaged over several sets of N sampling points which together represent an integration period. As mentioned above, for example, samples spaced at N=24 sample intervals can be sampled over a preset integration period of 0.01 seconds. In this example, step 514 checks if the sample has been acquired over the entire integration period. If the integration period has not been exhausted, the process 500 continues to sample by returning to step 510. On the other hand, if it is determined in step 514 that the integration period has been exhausted, then at step 516 the added N sampled signal values are divided by the total number of samples p acquired during the integration period, with the result then being multiplied point-by-point with the respective sine and cosine values stored in memory, see step 506. The multiplied result is a state vector ($S_{1I}$, $S_{1Q}$, $S_{2I}$, $S_{2Q}$, $S_{4I}$, $S_{4Q}$) of the fiber optic sensor system having six elements (for the exemplary three frequencies) and representing the in-phase and quadrature components of the fundamental frequency and the second and fourth harmonic frequencies of the sensor signal in the frequency domain, step 518.

The six elements of the state vector ($S_{1I}$, $S_{1Q}$, $S_{2I}$, $S_{2Q}$, $S_{4I}$, $S_{4Q}$) completely determine the characteristic features of the gyro and can be used to stabilize the gyro electronics as well as to compute the gyro rate (in radians/second) from the Sagnac phase shift. For example, the operating point of the PZT phase modulator can be stabilized by computing $\Theta_1 = \tan^{-1}(S_{2Q}/S_{2I})$, step 528, and adjusting the PZT drive frequency so that $\Theta_1 = \Theta_r$, step 530. As mentioned above, $\Theta_r$ is a measured calibration value determined during the initial setup of the gyro in step 502. Alternatively, the value of $\Theta_r$ can be used to recompute the coefficients such that the reference signal is in phase with the sensor output. In this case, only either the in-phase component or the quadrature component of the signal is required, thereby eliminating noise in the respective other channel and increasing the sensitivity at low signal levels.

Likewise, the absolute values $S_i = (S_{iI}^2 + S_{iQ}^2)^{1/2}$ can be computed at the fundamental frequency and the second and fourth harmonic frequencies (i=1, 2, 4), step 520. The modulation depth is computed from the response at the second and fourth harmonic frequencies according to the formula $m = S_2/S_4$, step 522, and maintained at a constant value $m = m_r$ by adjusting the PZT drive voltage, step 524. Having determined the modulation depth, the Sagnac phase shift which is proportional to the gyro rate, is computed in step 526 according to the formula $2\Phi = \tan^{-1}(J_2(m)*S_1/(J_1(m)*S_2))$, wherein $J_i(m)$ are Bessel functions. As mentioned above, an optimum value for the modulation depth is approximately m=1.8.

In summary, calibrating the initial phase shift during setup and sampling the gyro signal at an integer multiple of the PZT drive frequency provides a computationally simple process for stabilizing the operating parameters of the gyro and determining the gyro rate.

While the invention has been disclosed in connection with the preferred embodiments shown and described in detail, various modifications and improvements thereon will become readily apparent to those skilled in the art. For example, the aforedescribed DSP signal processing can also be applied to fiber optic current sensors, such as the minimum configuration (MC) and reduced minimum configuration (RMC) current sensor described in the copending U.S. patent application Ser. No. 09/459,438, which is incorporated herein by reference. Accordingly, the spirit and scope of the present invention is to be limited only by the following claims.

We claim:

1. A digital signal processing system for a fiber optic sensor measuring a physical quantity, comprising:
   a digital signal processor (DSP);
   a waveform generator producing a clock frequency which is an integer multiple of a modulator drive frequency of the fiber optic sensor; and
   a memory in communication with the DSP and storing frequency coefficients which are precomputed at the modulator drive frequency and at a plurality of harmonic frequencies not exceeding the fourth harmonic of the modulator drive frequency;
   a signal converter for sampling at the clock frequency an output signal produced by the fiber optic sensor,
   wherein the DSP multiplies the sampled output signal with respective ones of the frequency coefficients and forms at least an in-phase component at the respective frequencies to compute the physical quantity.

2. The digital signal processing system of claim 1, wherein the physical quantity is a rotation rate or a magnetic field.

3. The digital signal processing system of claim 2, wherein the magnetic field is produced by an electric current carried by an electric conductor.

4. The digital signal processing system of claim 1, further comprising adjusting means for adjusting a modulation depth at the modulator drive frequency based on a ratio of at least the in-phase components at the second and fourth harmonics.

5. The digital signal processing system of claim 1, further comprising a divider circuit which divides the clock frequency by an integer number to derive the modulator drive frequency.

6. The digital signal processing system of claim 4, wherein the modulation depth is adjusted by adjusting a modulator drive voltage.

7. The digital signal processing system of claim 4, wherein the modulation depth is adjusted by adjusting a modulator drive frequency.

8. A digitally controlled fiber optic sensor system, comprising:

a fiber sensing coil;

a light source supplying optical radiation to the fiber sensing coil;

a modulator disposed between the fiber sensing coil and the light source, the modulator driven at a modulator frequency and modulating the optical radiation supplied to the sensing coil;

a light detector for detecting return optical radiation returned from the fiber sensing coil and providing an output signal corresponding to a physical quantity detected by the fiber sensing coil;

a digital signal processor (DSP);

a waveform generator producing a clock frequency;

at least one divider which divides the clock frequency by an integer to produce the modulator drive frequency;

a light source driver supplying a current to the light source and controlled by the DSP so as to maintain at least one of a constant intensity of the optical radiation produced by the light source and an optical power of the return optical radiation detected by the light detector, a memory in communication with the DSP and storing frequency coefficients which are precomputed at the modulator drive frequency and at most three harmonics of the modulator drive frequency;

a signal converter for sampling at the clock frequency the output signal produced by the light detector, wherein the DSP multiplies the sampled output signal with respective ones of the frequency coefficients and forms at least an in-phase component at the respective frequencies to compute at least the physical quantity.

9. The digitally controlled fiber optic sensor system of claim 8, wherein the DSP further computes a modulation depth of the modulated optical radiation supplied to the fiber sensing coil and maintains the modulation depth at a predetermined value.

10. The digitally controlled fiber optic sensor system of claim 8, wherein the DSP further computes a phase shift of the modulated optical radiation supplied to the fiber sensing coil and maintains the phase shift at a predetermined value.

11. The digitally controlled fiber optic sensor system of claim 8, wherein the physical quantity is a rotation rate of the fiber optic sensor coil.

12. The digitally controlled fiber optic sensor system of claim 8, wherein the physical quantity is a magnetic field passing through the fiber optic sensor coil.

13. The digitally controlled fiber optic sensor system of claim 12, wherein the magnetic field is produced by an electric current carried by an electric conductor.

14. A method of digitally processing a signal of a fiber optic sensor, comprising:

(a) producing a clock frequency which is an integer multiple of a modulator drive frequency;

(b) computing sine and cosine coefficients at the modulator drive frequency and at a plurality of integer multiples of the modulator drive frequency not exceeding the fourth harmonic of the modulator drive frequency for a plurality of discrete signal sampling times;

(c) acquiring the signal of the fiber optic sensor at the discrete signal sampling times over an integration period;

(d) multiplying the acquired signal at at least a subset of the discrete signal sampling times with the corresponding sine and cosine coefficients corresponding to the same discrete signal sampling times to define a sensor state vector; and (e) determining from the sensor state vector characteristic operating parameters of the fiber optic sensor and a fiber optic sensor output signal.

15. The method of claim 14, wherein acquiring the signal of the fiber optic sensor includes (f) acquiring the signal during a time period related to the fundamental frequency;

(g) adding the signal acquired during the time period to a corresponding signal acquired during a previous time period and during the same integration period, and (h) repeating steps (f) and (g) until the integration period is exhausted.

16. The method of claim 14, wherein the characteristic operating parameters of the fiber optic sensor include at least one of a second phase shift and a modulation depth.

17. The method of claim 16, wherein an initial phase shift is determined during setup of the fiber optic sensor and the second phase shift is matched to the initial phase shift by adjusting the modulator drive frequency.

18. The method of claim 16, wherein the second phase shift is adjusted so that either an in-phase component or a quadrature component of the sensor state vector at at least the modulator drive frequency are approximately equal to zero.

19. The method of claim 16, wherein a modulator drive voltage is adjusted for maintaining the modulation depth equal to an initial modulation depth.

* * * * *